United States Patent Office 3,414,380
Patented Dec. 3, 1968

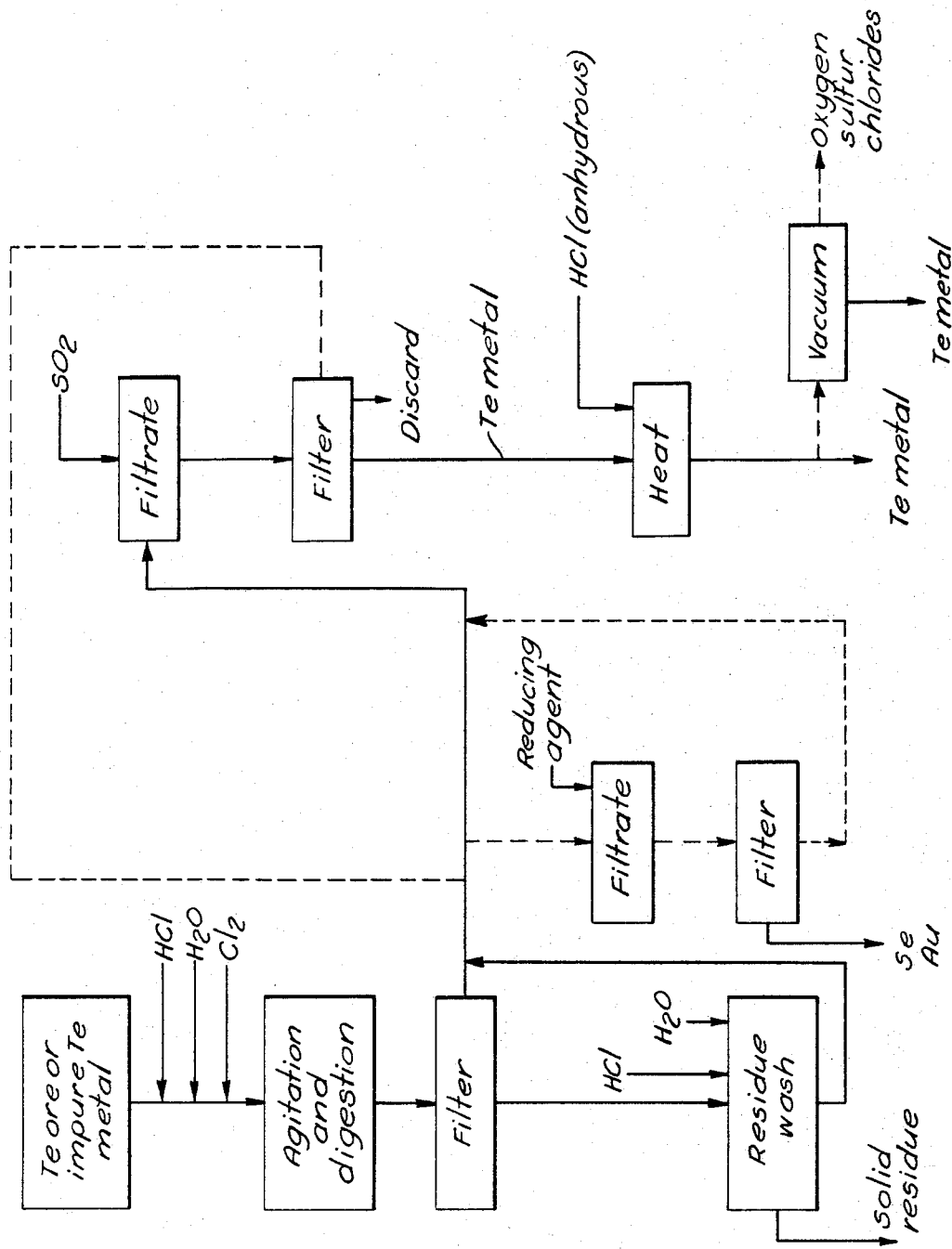

3,414,380
EXTRACTION OF TELLURIUM FROM TELLURIUM-BEARING ORES
William A. Mod, Lake Jackson, Tex., assignor to The Dow Chemical Company, Midland, Mich., a corporation of Delaware
Filed Aug. 9, 1965, Ser. No. 478,298
2 Claims. (Cl. 23—209)

ABSTRACT OF THE DISCLOSURE

This invention relates to a method of recovering tellurium from tellurium-bearing ores which comprises digesting the tellurium-bearing ore at a temperature of from about 25 to about 108° C. in an aqueous solution of HCl containing an excess of chlorine, separating the undigested material therefrom, treating the remaining solution with sufficient reducing agent to cause the precipitation of selenium and gold therefrom without precipitating a substantial quantity of tellurium, separating the selenium and gold thus precipitated, treating the remaining aqueous phase with $SO_2$ to cause precipitation of the tellurium contained therein and separating the tellurium thus precipitated from the aqueous solution. The tellurium product produced thereby is then converted to a high purity tellurium by heating in an atmosphere of anhydrous HCl at a temperature above about 150° C., then applying a vacuum thereto or by alternatively applying vacuum and inert gaseous purges to such heated material.

---

This invention relates to a process for the extraction of tellurium from tellurium-bearing ores and more particularly relates to an improved process whereby the tellurium is continuously extracted in high yields and in a highly purified form.

Tellurium metal is now produced from slimes of the copper and lead industries, and is likewise produced from raw tellurium-bearing ores. The ores are generally treated with sodium hydroxide to dissolve the $TeO_2$ and roasted with $H_2SO_4$ to convert native tellurium to tellurites. Caustic is then used to leach the tellurites from the roast, and tellurium is recovered from the leach solution by precipitation with $SO_2$ or is precipitated as $TeO_2$ which is subsequently reduced to the metal. Such processes are described in Rare Metals Handbook by Hampel. An alternate method is taught by V. I. Zelenov and Z. M. Shtrineva in "Extraction of Tellurium," Tsvetnye Metally, No. 12, 1961, pp. 59–61, which teaches treating an ore containing tetradymite ($Bi_2Te_2S$) with a salt solution, adding chlorine thereto, separating solids from the solution, and precipitating the tellurium metal from the solution by adding $SO_2$ thereto. Such a process produces only a moderate yield of a metal which is 53 percent tellurium. While the art, therefore, discloses methods for extracting tellurium from tellurium-containing sources, no process has heretofore been made available which will produce a high yield of a high purity tellurium metal.

It is therefore an object of this invention to provide a process for recovering tellurium in relatively pure form from the available impure sources. Another object of this invention is to provide a continuous process whereby tellurium and other valuable metals are recovered from ores and other low grade tellurium sources in good yield. Still another object of this invention is to provide a continuous process whereby both anion and cation impurities may be removed from tellurium metal. Other objects and advantages of this process will become apparent from the following detailed description.

It has now been discovered that high yields of relatively pure tellurium may be obtained from ores and other impure tellurium metal sources by digesting such ore in an aqueous hydrochloric acid solution containing an excess of elemental chlorine, filtering the digested slurry, diluting the filtrate with water when necessary, and adding sufficient $SO_2$ to the filtrate to cause precipitation of the tellurium metal. The metal thus obtained may be recovered by filtration and washing to produce a relatively pure tellurium metal. If the ore or impure tellurium source material contains significant amounts of selenium and/or gold impurities, these elements may be removed and recovered from the tellurium metal by suspending such source material in a concentrated aqueous HCl solution containing an excess of chlorine, filtering if necessary to remove the gangue therefrom, adding thereto a quantity of a reducing agent such as $FeSO_4$, $FeCl_2$, $CuCl_2$, or $SO_2$ sufficient to precipitate substantially all of the Se and Au present, and filtering to remove the metallic selenium and/or gold precipitate from the tellurium solution. The tellurium metal may then be precipitated by $SO_2$ addition to the diluted filtrate to recover a relatively pure tellurium. Additionally, higher purity tellurium metal may be prepared from the relatively pure product obtained herein by treating the tellurium metal in powder form with anhydrous hydrochloric acid at a temperature above 150° C. and subsequently removing the remaining impurities under high vacuum. This additional purification treatment is applicable to removing anions, particularly oxygen, sulfur and chlorides.

The first step in this process involves digestion of the tellurium-containing ore, or other impure tellurium source, in an aqueous HCl medium which contains an excess of chlorine. In general, the digestion may be carried out at any temperature from about 25° C. to about 108° C. with a hydrochloric acid solution containing from about 3 to about 37 percent by weight HCl and an excess of chlorine. Lower temperatures in the range of 25 to 50° C. show a surprising advantage, however, in that while the tellurium is adequately solubilized in this temperature range, less of the impurities are solubilized. By the expression "an excess of chlorine" is meant that chlorine should be present in an amount in excess of that required to convert all the tellurium present to the $Te^{+4}$ form. Chlorine may be added to water in sufficient quantity to produce all or part of the HCl required, as well as forming HOCl which is the equivalent of chlorine for solubilizing the tellurium values herein.

A digestion time of from about 1 to about 8 hours is generally sufficient. This will, of course, vary with temperature and with HCl concentration, the higher temperatures and higher HCl concentrations requiring shorter digestion times. While atmospheric pressure is sufficient for this digestion additional pressure may be applied if desired in order to increase the solubility of chlorine.

It is desirable to employ HCl and chlorine in amounts which are in excess of that theoretically required to dissolve the oxides and to react with the tellurium and solubilize it. It is desirable to agitate the mixture during the digestion process but agitation by stirring is sufficient for this purpose.

At the end of the digestion period, the slurry is cooled to about room temperature and filtered. The residue is washed with dilute HCl and finally with water and the total filtrate is collected. The solid residue at this point has had virtually all of the tellurium removed therefrom but it may, of course, be redigested and reextracted if necessary or desirable. The filtrate contains a relatively pure form of $Te^{+4}$ in solution. Tellurium contained therein may be precipitated by adding a sufficient quantity of $SO_2$ thereto to precipitate the tellurium metal, the precipitation occurring best if the HCl concentration is less than 21%. Once precipitated, the tellurium metal may be filtered off and washed to produce yields of 92% or more of a metal containing greater than 99% tellurium, generally greater than 99.995% Te.

Alternately, if the ore or impure tellurium metal employed as a starting material contains significant quantities of selenium and/or gold, these may be removed from the tellurium and recovered in purified form at this point. Selenium may be quantitatively removed from the relatively pure tellurium metal obtained above, by digesting at a temperature of from 25° C. to the boiling point of the mixture of the selenium-containing tellurium metal in concentrated (26–37%) HCl which is saturated with chlorine. After digestion, the slurry is filtered and the filtrate is treated with a reducing agent such as $Fe^{++}$, $Cu^+$, $Sn^{++}$, $P^+$ ions preferably in the chloride or sulfate form. $SO_2$ may also be used to precipitate the selenium present. Upon such treatment, the selenium precipitates from solution and may be removed as a solid phase by filtration. The selenium thus recovered is of high purity and the tellurium in the liquid phase may be recovered by subsequent precipitation with $SO_2$ after the HCl concentration is diluted to less than about 21%. The last traces of Se may be removed from the solution prior to precipitation of the Te by adding sufficient water to lower the HCl concentration to less than about 21%, then adding $SO_2$ until the first sign of a precipitate or scum forms on the solution. Removal of this precipitate or scum by filtration leaves a highly purified tellurium in solution. The Se may be recovered in a similar manner directly from the Te-containing filtrate in the first step of this process prior to $SO_2$ precipitation of the tellurium.

Gold likewise may be recovered from the relatively high purity tellurium produced above or may be removed directly from the tellurium-containing filtrate prior to precipitation of the tellurium metal with $SO_2$. If the filtrate containing tellurium likewise contains an appreciable quantity of gold, this may be recovered by adding thereto a reducing agent such as $FeSO_4$, $FeCl_2$, or $Cu_2Cl_2$ in a quantity sufficient to precipitate no more than 1 to 3% of the Te present. Such a quantity will cause substantially all gold to precipitate and leaves a purified tellurium in solution. Likewise the gold may be removed from the solution by employing $SO_2$ as the reducing agent. If gold is to be recovered, however, $SO_2$ is added in sufficient quantity to precipitate not more than 1 to 3% of the tellurium in the solution. Substantially all of the gold will thus be precipitated, leaving the purified tellurium in solution. In all instances, the gold-containing product thus recovered is easily purified and the gold may be easily recovered therefrom. When not previously removed as described above gold may likewise be recovered from a relatively pure tellurium metal, such as produced herein, by redissolving the tellurium in an aqueous solution of 26–37% HCl and containing an excess of chlorine at a temperature of from about 25° C. to the boiling point of the mixture. Once redissolved, the gold is precipitated with a reducing agent and recovered in a purified form as described above because the Te values do not precipitate from the concentrated (26–37%) HCl.

Further purification of the relatively pure tellurium metal herein obtained may be effected by heating the tellurium metal powder in the presence of anhydrous HCl at a temperature between about 150° C. and the boiling point of the metal, preferably from about 250 to about 500° C. After contact of the anhydrous HCl with the tellurium metal for a period of from 10 minutes to about 4 hours, the application of vacuum to the treated metal will remove most anion impurities and is particularly effective for the removal of sulfur, oxygen and chloride.

FIGURE 1 is a schematic flow diagram showing an integrated continuous flow process employing the invention herein.

As shown in FIGURE 1 a source of tellurium, such as a tellurium ore or impure tellurium metal, is mixed with a solution of HCl, $Cl_2$ and water and the mixture is passed to a zone for mixing and digesting. An HCl concentration of 3 to 37% by weight is generally used depending on the nature of the tellurium source being digested and chlorine is always present in excess. If selenium and/or gold is to be recovered, an HCl concentration of 26–37% is preferably employed. After the ore or other telluriumcontaining material has been adequately digested, the mass is filtered. Any solid residue remaining from the filtration is generally washed first with dilute HCl and finally with water and again filtered to remove any remaining tellurium or other available metal value. After washing and filtration, the solid residue is usually discarded and the filtrates from both the digestion and washing steps are combined. The combined filtrates may then pass to a holding vessel where a reducing agent such as $FeSO_4$ is added thereto in sufficient quantity to cause precipitation of any selenium or gold contained therein. After such treatment, the metallic selenium and/or gold are removed by filtration leaving a relatively pure tellurium salt in solution in the filtrate. This step for the removal of selenium and/or gold is an optional step required only when recovery of these metals is desirable or where their presence in the tellurium is undesirable. To recover the tellurium, the filtrate from the digestion step, or alternately from the Se and/or Au removal step, is diluted to about 21% HCl or less and treated with sufficient $SO_2$ to cause precipitation of the tellurium metal contained in such filtrate. An $SO_2$ concentration of from a slight excess of the theoretical amount required to react with the Te present to the saturation point of the solution is generally employed to assure adequate precipitation of the metallic Te. Filtration of this material and washing and drying of the metallic Te recovered thereby usually produces a yield of Te of >98% of theoretical and the metal has a purity usually of > 99.995%. Additional purity of the Te metal is achieved by heating the metal powder in the presence of anhydrous HCl to a temperature of preferably between 250° and 500° C. for a period of from about 10 minutes to 4 hours at atmospheric pressure, then reducing the pressure on the hot tellurium for sufficient time to essentially remove the volatile impurities. A purge of nitrogen or other chemically inert gas may be used in place of or in combination with the vacuum in this step. The metal is then cooled to produce Te having generally a purity of >99.999%.

The following examples show specific preferred embodiments of the invention but are not to be construed as limiting the scope of the invention thereto.

In the following Examples 1 through 4 the percent recovery of Te is based on the analysis of the filtrate and the residue.

EXAMPLE 1

1899 grams of raw ore (<8 mesh) containing about 1.1–1.3% Te, both as $TeO_2$ and native tellurium, was digested in 1,000 ml. of 10% HCl for 1 hour at 100° C. while continuously adding $Cl_2$ to the slurry and stirring. At the end of 1 hour of such digestion the slurry was cooled to room temperature and filtered. The residue was washed first with 1% HCl and then with distilled $H_2O$. A total of 3263 grams of filtrate and washings was collected. The residue and filtrate were analyzed and 97% of the tellurium was found to have been extracted from the ore.

Tellurium was precipitated from the acid leach solution by heating to about 90–95° C. and bubbling excess $SO_2$ through the solution for 6.5 hours. The metal was removed by filtration, washed with distilled $H_2O$, anhydrous alcohol, and finally ether, then dried under vacuum. The metal thus obtained was analyzed by emission spectroscopy. The following analyses show the purity of the metal obtained and likewise show a recovery of 92% of the tellurium from the solution.

Analysis of leach solution:

| | | |
|---|---|---|
| Al | p.p.m. | 260 |
| Ca | p.p.m. | 160 |
| Cu | p.p.m. | 250 |
| Fe | p.p.m. | 3200 |
| Mn | p.p.m. | 260 |
| Sr | p.p.m. | 13 |
| Au | p.p.m. | <.5 |
| Ag | p.p.m. | 35 |
| Ba | p.p.m. | <1 |
| W | p.p.m. | 0.1 |
| Te | percent | 0.72 |

Analysis of residue (1837 gms.): Te ____p.p.m.__ 400

Analysis of Te metal for impurities:

| | P.p.m. |
|---|---|
| Al | 9 |
| B | 21 |
| Cu | 100 |
| Fe | 38 |
| Au | 190 |
| Ag | 1000 |
| Si | 2.8 |
| W | 10,000 |
| Cr | 26 |
| Pb | 150 |
| Ni | <2 |
| Te | Bal. |

EXAMPLE 2

100 grams of raw ore (<8 mesh) containing about 1.1–1.3% Te, both as $TeO_2$ and native metal, was digested with 200 ml. of 10% HCl for 1 hour at 30° C. while adding excess $Cl_2$ to the slurry and stirring. The slurry was then filtered, and the residue was washed first with 1% HCl and then with distilled $H_2O$. Analysis showed 92.6% of the tellurium to have been extracted from the ore.

Tellurium was precipitated from this acid leach solution by first adjusting the HCl concentration to 10% by weight of the water present, heating to the boiling point, and bubbling $SO_2$ through the solution for about 1 hour. The metal was filtered off, washed successively with 10% by weight HCl, distilled $H_2O$, anhydrous alcohol, and finally acetone, then dried under vacuum. Essentially 100% of the metal was precipitated from the solution and recovered. The analysis of the acid leach solution, the residue and the tellurium metal for impurities were as follows:

Analysis of acid leach solution (642.5 gms.):

| | | |
|---|---|---|
| Al | p.p.m. | 32 |
| Cu | p.p.m. | 110 |
| Mn | p.p.m. | 70 |
| Au | p.p.m. | 0.9 |
| Zn | p.p.m. | 36 |
| Pb | p.p.m. | 27 |
| Ca | p.p.m. | 30 |
| Fe | p.p.m. | 350 |
| Mg | p.p.m. | 320 |
| Ag | p.p.m. | 13 |
| W | p.p.m. | <5 |
| Ni | p.p.m. | .2 |
| Te | wt. percent | 0.17 |

Analysis of residue (98.17 gms.): Te ____p.p.m.__ 900

Analysis of tellurium metal for impurities therein:

| | p.p.m. |
|---|---|
| Al | 0.3 |
| B | <.5 |
| Cu | 1.7 |
| Fe | 6.8 |
| Au | 200 |
| Ag | 0.8 |
| Si | 2.1 |
| W | No trace |
| Ba | <10 |
| Te | Bal. |

EXAMPLE 3

2,195.4 grams raw ore (<8 mesh) containing about 1.1–1.3% Te, both as $TeO_2$ and native metal, were digested with 1000 ml. $H_2O$ for 1 hour while continuously adding $Cl_2$ to the slurry and stirring. The temperature increased spontaneously from 23° C. to 42° C. during addition of the chlorine. At the end of this period, the slurry was filtered, and the residue was washed with 700 ml. of 1 N HCl followed by 250 ml. of distilled water. A total of 1956 grams of filtrate was collected. Analyses of the filtrate and residue (2149 gms.) showed that 62% of the tellurium was extracted.

Tellurium was essentially completely precipitated from a portion of the leach solution by first adjusting the HCl concentration to 10%, heating to about 90° C., and bubbling $SO_2$ through the solution for about 4 hours. The metal was filtered off, washed successively with 10% HCl, distilled $H_2O$, alcohol, and acetone, then dried in a vacuum. The analysis of the acid leach solution, residue and tellurium metal product for impurities were as follows:

Analysis of acid leach solution:

| | | |
|---|---|---|
| Al | p.p.m. | 150 |
| Cu | p.p.m. | 800 |
| Mn | p.p.m. | 410 |
| Au | p.p.m. | 6.0 |
| Ba | p.p.m. | <1 |
| Ca | p.p.m. | 160 |
| Fe | p.p.m. | 1800 |
| Ag | p.p.m. | 0.6 |
| W | p.p.m. | <5 |
| Te | percent | 0.90 |

Analysis of residue (2149 gms.): Te ____percent__ 0.5

Analysis of tellurium metal for impurities:

| | p.p.m. |
|---|---|
| Al | 0.29 |
| Cu | 12 |
| Au | 280 |
| Si | 1.4 |
| Ba | <10 |
| B | <.5 |
| Fe | 13 |
| Ag | 0.8 |
| W | 0 |
| Te | Bal. |

EXAMPLE 4

15 grams of raw ore (<100 mesh) containing about 3.0–3.1% Te, both as $TeO_2$ and native metal, was digested with 100 ml. of 12% HCl for 1 hour at 23–42° C. while adding excess chlorine to the slurry and stirring. At the end of this time, the slurry was filtered, and the residue was washed with 10% HCl and then with distilled $H_2O$. A total of 238.6 grams of filtrate was collected and analyzed showing that 98.5% of the tellurium had been extracted. The analyses were as follows:

Analysis of filtrate (238.6 gms.):

| | | |
|---|---|---|
| Al | p.p.m. | 24 |
| Ca | p.p.m. | 88 |
| Cu | p.p.m. | 160 |
| Fe | p.p.m. | 1700 |
| Mn | p.p.m. | 44 |
| Sr | p.p.m. | 3 |
| Au | p.p.m. | 5.0 |
| Ag | p.p.m. | 19 |
| Zn | p.p.m. | 9 |
| Ba | p.p.m. | <10 |
| W | p.p.m. | <5 |
| Te | wt. percent | 0.19 |

Analysis of residue (13.66 gms.): Te ___p.p.m.___ 500

EXAMPLE 5.—REMOVAL OF Au

Samples of raw ore containing tellurium, both native and oxide, were digested with the $HCl-Cl_2$ system as in Example 4 above and the slurries filtered, and residues washed. To the leach solutions, various reducing agents were added and the precipitates formed were filtered off. Precipitates were dissolved in aqua regia. Solutions were analyzed before and after treatment by emission spectroscopy and material balances were then calculated. Results are as follows:

TABLE I

| Run No. | Reducing Agent | Au, p.p.m. | | | Au Removal, Percent |
|---|---|---|---|---|---|
| | | Starting Soln. | Final Soln. | Aqua Regia | |
| 1 | $FeSO_4 \cdot 7H_2O$ | 5 | <0.05 | 2.8 | 98.2 |
| 2 | $Cu_2Cl_2$ | 5 | <0.05 | 3.8 | 99 |
| 3 | $FeSO_4 \cdot 7H_2O$ | 0.8 | <0.05 | 3.0 | 100 |
| 4 | $FeCl_2$ | 0.8 | .11 | 3.9 | 95 |

EXAMPLE 6.—REMOVAL OF Au

A sample of tellurium was solubilized as in Example 3 and a portion of such solution was treated with $SO_2$ until no more tellurium precipitated. Emission spectroscopic analysis showed the tellurium to contain 280 p.p.m. Au. To another portion of this solution, $SO_2$ was added until about 3.0% of the Te precipitated. The precipitate was removed by filtration and the remainder of the Te precipitated from the filtrate with $SO_2$. Emission spectroscopic analysis of the washed and dried tellurium metal showed it to contain 4.6 p.p.m. Au. The analysis of the Te showed the following impurities in p.p.m.:

| | |
|---|---|
| Al | .19 |
| Bo | <.5 |
| Ca | .7 |
| Fe | 8 |
| Au | 4.6 |
| Ag | .01 |
| Si | 1.5 |

EXAMPLE 7.—REMOVAL OF SELENIUM 240 grams of crude tellurium metal (99.7%), containing 250 p.p.m. Se, were dissolved in 37% HCl with an excess $Cl_2$. The solution was filtered, and 2250 grams of filtrate collected. This was divided into four equal parts.

Part I was treated with sufficient $SO_2$ to precipitate the Se. The precipitated Se was removed by filtration, and sufficient distilled $H_2O$ was added to the filtrate to adjust the HCl concentration to approximately 10%. The Te was then precipitated with $SO_2$ at a temperature of about 90° C. and was removed by filtration, washed, dried, and analyzed by X-ray emission.

A total of 20 grams of $FeCl_2 \cdot 4H_2O$ was added to Part II to precipitate Se. After removing the Se by filtration, 1135 grams distilled $H_2O$ were added to the filtrate, and Te was precipitated with $SO_2$ at 90° C. The Te was filtered off, washed, dried and analyzed by X-ray emission.

To Part III was added 20 grams of $FeSO_4 \cdot 7H_2O$ which caused Se to precipitate. The Se was removed by filtration and 1135 grams of distilled water were added to the filtrate to adjust the HCl concentration. The Te was then ppted. with $SO_2$ at 90° C., removed by filtration, washed, dried and analyzed.

Part IV was diluted with 1135 grams of distilled water. $SO_2$ was fed slowly to the solution while stirring until a reddish-brown (Se) precipitate formed. This material was removed by filtration and Te was precipitated from the filtrate at 90° C. by adding more $SO_2$. Te was removed by filtration, washed, dried, and analyzed by X-ray emission.

The results were as follows:

| Part | System | Reducing Agent | Se in Original Metal, p.p.m. | Se in Treated Metal, p.p.m. |
|---|---|---|---|---|
| I | 37% $HCl-Cl_2$ | $SO_2$ | 250 | 5±5 |
| II | 37% $HCl-Cl_2$ | $FeCl_2 \cdot 4H_2O$ | 250 | 25±5 |
| III | 37% $HCl-Cl_2$ | $FeSO_4 \cdot 7H_2O$ | 250 | 5±5 |
| IV | 10% $HCl-Cl_2$ | $SO_2$ | 250 | 13±5 |

EXAMPLE 8.—REMOVAL OF SULFUR

Approximately 15 grams of tellurium metal powder, prepared as in Example 3, were placed in a Vycor (high temperature glass) boat, the boat being placed within a 1-inch Vycor tube. The Vycor boat and tube was placed inside a horizontal furnace and purged with $N_2$. A slow anhydrous HCl purge was then started and the temperature increased. At around 170° C., a noticeable reaction began, and a sublimate collected on the colder section of the 1-inch tube. Temperature was increased to 270° C. while maintaining an anhydrous HCl atmosphere. The system was then evacuated to a reduced pressure of about 29–30 inches of Hg. Analysis of the metal before treatment showed it to contain 55 p.p.m. S. After treatment, analysis showed <5 p.p.m. sulfur.

EXAMPLE 9.—REMOVAL OF OXYGEN AND CHLORIDES

In the same manner as Example 8 a sample of tellurium metal prepared as in Example 3 and analyzing 13 p.p.m. O and 13 p.p.m. Cl was placed in a Vycor tube, the tube was evacuated, filled with anhydrous HCl and heated to 425° C. At around 200° C., water and a black sublimate formed on the cooler section of the tube. At around 430° C., the excess HCl was drawn off and the tube evacuated. The metal was melted, cooled, and analyzed.

Analysis indicated that the metal contained 1.5 to 2 p.p.m. O and 2 to 6 p.p.m. Cl.

EXAMPLE 10

To illustrate the overall process, runs were made in the following manner.

One part by weight of crude tellurium metal (about 99.7 weight percent Te) was added to from 4.4 to 4.6 parts by weight of 37% HCl. Tellurium was in the form of a fine to coarse powder (particle sizes all <100 mesh). Chlorine was dispersed through the aqueous HCl-Te slurry by means of an air-driven turbine-type impeller. The chlorine was fed to the reactor at a rate sufficient to maintain a slight excess over that required for the reaction of chlorine and tellurium under the conditions employed. Particle size, degree of chlorine dispersion, degree of mixing, and the temperature determined the rate of reaction of chlorine and tellurium. The tellurium was dissolved in from 4 to 6 hours. About 1.2 to 1.4 parts by weight of chlorine per part of tellurium were required to dissolve the tellurium. A temperature rise from about 23° C. to about 70° C. was experienced. The tellurium-containing solution was cooled to about 45–50° C. and $SO_2$ was dispersed in the solution until no further selenium precipitated; any gold present also precipitated (essentially no tellurium precipitates at this HCl concentration). The Se precipitated in rather coarse particles. The slurry was allowed to cool to room temperature and the slurry was filtered through a fine glass frit funnel to remove the Se and Au. The filtrate was diluted with from about 1.65 to about 2.17 parts by weight of deionized water per one part by weight of 37% HCl. This resulted in a solution containing from 6.0 to 6.6% Te and 10.2 to 10.9% HCl. $SO_2$ was dispersed through the solution to precipitate about 0.5 to about 1.0% of the Te present. The last traces of Se also precipitated at this point. The got was carefully removed from the vessel in such a manner as to prevent contamination. A portion of the ingot was analyzed for trace impurities by emission spectroscopy, colorimetric methods, and polarigraphically.

The following chart of data show the results obtained in four runs performed according to this experiment. The data shows the analysis of the starting impure Te and the analysis of the purified Te ingot in p.p.m.

| Impurity | Run 1 | | Run 2 | | Run 3 | | Run 4 | |
|---|---|---|---|---|---|---|---|---|
| | Feed | Product | Feed | Product | Feed | Product | Feed | Product |
| Sb | N.D. | N.D. | N.D. | N.D. | N.D. | N.D. | N.D. | N.D. |
| Te | N.D. | N.D. | N.D. | N.D. | N.D. | N.D. | N.D. | N.D. |
| Mg | N.D. | N.D. | N.D. | N.D. | N.D. | N.D. | N.D. | N.D. |
| Mn | N.D. | N.D. | N.D. | N.D. | N.D. | N.D. | N.D. | N.D. |
| Pb | N.D. | N.D. | N.D. | N.D. | 540 | N.D. | N.D. | N.D. |
| Sn | N.D. | N.D. | N.D. | N.D. | N.D. | N.D. | N.D. | N.D. |
| Si | 0.9 | 0.1 | 0.4 | <0.2 | 14 | 0.7 | 7 | <0.1 |
| Cr | N.D. | <0.1 | N.D. | <0.1 | N.D. | N.D. | N.D. | <0.1 |
| Fe | 9.5 | <1.0 | 2.5 | <1.0 | 6.5 | 3.6 | 8 | <0.1 |
| Ni | N.D. | <0.1 | N.D. | N.D. | N.D. | N.D. | N.D. | <0.1 |
| Bi | N.D. | N.D. | N.D. | N.D. | 110 | N.D. | N.D. | N.D. |
| Al | N.D. | <0.1 | <1.0 | <0.1 | 2.1 | N.D. | N.D. | <0.1 |
| Ca | N.D. | N.D. | N.D. | N.D. | N.D. | N.D. | N.D. | <0.5 |
| Cu | <0.1 | <0.1 | 1.3 | <0.1 | 68 | N.D. | 20 | <0.1 |
| In | N.D. | N.D. | N.D. | N.D. | N.D. | N.D. | N.D. | N.D. |
| Cd | N.D. | N.D. | N.D. | N.D. | N.D. | N.D. | N.D. | N.D. |
| Zn | N.D. | N.D. | N.D. | N.D. | N.D. | N.D. | N.D. | N.D. |
| As | N.D. | N.D. | N.D. | N.D. | N.D. | N.D. | N.D. | N.D. |
| Ag | 3 | <0.1 | 5 | <.01 | 7 | N.D. | 14 | <0.01 |
| Hg | N.D. | N.D. | N.D. | N.D. | N.D. | N.D. | N.D. | N.D. |
| Ba | <0.1 | <0.1 | N.D. | <0.1 | N.D. | N.D. | N.D. | <0.1 |
| An | N.D. | N.D. | <0.5 | <0.5 | <0.5 | N.D. | N.D. | <0.5 |
| Se [a] | 100 | <0.5 | 47 | <1.0 | 700 | 1.1 | 820 | <1.0 |
| B | <0.5 | <0.5 | <0.5 | <0.5 | <0.5 | <0.5 | <0.5 | <0.5 |
| Cl [b] | 60 | 5 | N.A. | <2 | N.A. | <2.0 | N.A. | <2.0 |
| S [b] | 20 | <0.5 | N.A. | 3.2 | N.A. | 1.5 | N.A. | <1.0 |

[a] Se and S were analyzed by colorimetrically.
[b] Cl was analyzed by polarigraphically.
N.D.—None detected. N.A.—Not analyzed.

slurry was allowed to stand for several hours to allow any Ag in excess of the AgCl solubility to precipitate. The Te, Se, Au, and Ag values now present as solids were filtered out in a fine Pyrex glass frit filter. The filtrate was heated to about 80–85° C. and $SO_2$ dispersed in the solution with thorough mixing. The balance of the Te precipitated as a fine to coarse crystalline powder. About 1.25 parts $SO_2$ by weight was required to precipitate 1 part by weight of Te. The Te precipitation was essentially complete in from about 6 to 8 hours and the hot slurry was filtered in a closed Pyrex glass coarse-frit funnel to minimize contact of the wet metal with air. The metal retained in the filter was washed with about 1 part of 10% HCl (at 90–100° C.) to one part of Te metal to displace the mother liquor and remove the bulk of the sulfate. The metal was then washed with 8 parts of deionized water per part of metal to essentially remove the chloride and sulfate values. After the wash effluent showed no chloride when checked with an $AgNO_3$ reagent the washing was stopped. The wet metal was first dried under reduced pressure at room temperature and further dried at 50–100° C. at reduced pressure in a vacuum-oven.

The dry Te powder was placed in a high temperature silica glass vessel and this vessel was placed in a Pyrex vacuum-chamber heated by an electric furnace. The vessel was slowly evacuated to 29–30 inches Hg, back-filled and purged with dry nitrogen, and again evacuated to about 29–30 inches Hg. The temperature was increased to 150–200° C. and the vessel was back-filled with anhydrous HCl. The HCl powder was held in contact with the HCl until the temperature of the furnace reached about 450° C. (about 10–20 minutes) to allow any $TeO_2$ present to react with the HCl. The Pyrex vessel was slowly evacuated and maintained under reduced pressure as the temperature was raised to about 500° C., then the vessel was back-filled and purged with dry $N_2$. Twice more, the vessel was evacuated and back-filled with $N_2$. The $N_2$ flushing and evacuation essentially removed the HCl and chlorides. The temperature was increased to the point where the Te melted, then the vessel was allowed to cool and the Te ingot was carefully removed from the vessel in such a

I claim:
1. A process for the recovery of tellurium from a tellurium-bearing ore which comprises:
   (1) digesting the tellurium-bearing ore at a temperature of from about 25 to about 108° C. in an aqueous solution of hydrochloric acid containing an excess of chlorine.
   (2) separating any undigested material therefrom,
   (3) subsequently treating said aqueous solution with sufficient reducing agent to cause precipitation of any selenium and gold contained therein but not sufficient to precipitate a substantial quantity of tellurium,
   (4) separating the selenium and gold thus precipitated,
   (5) treating the remaining aqueous phase with sufficient $SO_2$ to cause precipitation of the tellurium contained therein,
   (6) separating the tellurium thus precipitated from the aqueous solution,
   (7) heating the tellurium metal thus produced in an atmosphere of anhydrous HCl at a temperature of greater than about 150° C. for a period of from 10 minutes to 4 hours, and
   (8) applying a vacuum to the tellurium metal thus treated.

2. The process of claim 1 wherein the precipitated metallic tellurium is heated to a temperature of from about 200 to 500° C. in the presence of anhydrous HCl and vacuum is then applied thereto to produce an extremely high purity tellurium metal.

References Cited

UNITED STATES PATENTS

| 2,414,294 | 1/1947 | Gardner | 23—209 |
| 3,158,443 | 11/1964 | Champ | 23—209 |
| 2,111,112 | 3/1938 | Dudley | 23—209 |
| 2,076,738 | 4/1937 | Martin et al. | 23—209 |

HYLAND BIZOT, *Primary Examiner.*